(12) United States Patent
Hsieh (10) Patent No.: US 10,593,945 B2
(45) Date of Patent: Mar. 17, 2020

(54) PRINTED PLANAR LITHIUM-ION BATTERIES

(71) Applicant: Bing R. Hsieh, South San Francisco, CA (US)

(72) Inventor: Bing R. Hsieh, South San Francisco, CA (US)

(*) Notice: Subject to any disclaimer, the term of this patent is extended or adjusted under 35 U.S.C. 154(b) by 400 days.

(21) Appl. No.: 15/464,225

(22) Filed: Mar. 20, 2017

(65) Prior Publication Data

US 2018/0269442 A1    Sep. 20, 2018

(51) Int. Cl.

| | | |
|---|---|---|
| *H01M 2/10* | (2006.01) |
| *H01M 10/0525* | (2010.01) |
| *H01M 4/62* | (2006.01) |
| *H01M 4/58* | (2010.01) |
| *H01M 4/505* | (2010.01) |
| *H01M 4/525* | (2010.01) |
| *H01M 4/56* | (2006.01) |
| *H01M 4/587* | (2010.01) |
| *H01M 4/38* | (2006.01) |
| *H01M 10/0585* | (2010.01) |
| *H01M 10/052* | (2010.01) |
| *H01M 10/04* | (2006.01) |

(52) U.S. Cl.
CPC ....... *H01M 4/5825* (2013.01); *H01M 10/052* (2013.01); *H01M 10/0585* (2013.01); *H01M 2010/0495* (2013.01)

(58) Field of Classification Search
CPC .......... H01M 10/052; H01M 10/0585; H01M 2010/0495; H01M 4/5825
See application file for complete search history.

(56) References Cited

U.S. PATENT DOCUMENTS

| | | | |
|---|---|---|---|
| 6,535,398 B1 | 3/2003 | Moresco | |
| 6,632,563 B1 * | 10/2003 | Krasnov | H01M 4/04 429/127 |
| 8,927,149 B2 | 1/2015 | Ohara et al. | |
| 2010/0175934 A1 | 7/2010 | Lam et al. | |
| 2010/0178543 A1 | 7/2010 | Gruner et al. | |
| 2011/0281162 A1 | 11/2011 | Buiel et al. | |
| 2012/0077095 A1 | 3/2012 | Roumi et al. | |
| 2013/0250479 A1 | 9/2013 | Manohara et al. | |

(Continued)

FOREIGN PATENT DOCUMENTS

WO    2014097015 A1    6/2014

OTHER PUBLICATIONS

Dudney, "Thin Film Micro-Batteries," The Electrochemical Society Interface, Fall 2008, pp. 44-48.

(Continued)

*Primary Examiner* — Robert S Jones
*Assistant Examiner* — Rachel L Zhang
(74) *Attorney, Agent, or Firm* — R'Sue Popowich Caron (57) ABSTRACT

A planar microbattery cell array is disclosed. The array includes a number of battery cells arranged parallel to one another on a substrate. The cells include positive electrodes with positive current collectors, negative electrodes with negative current collectors, and solid or gel polymer electrolyte. The current collectors may be arranged in an interdigitated configuration. The novel 3D battery design is suitable for large format batteries and can be manufactured easily and cost-effectively using printing methods.

21 Claims, 8 Drawing Sheets

(56) References Cited

U.S. PATENT DOCUMENTS

| | | | |
|---|---|---|---|
| 2014/0029161 A1 | 1/2014 | Beidaghi et al. | |
| 2014/0255798 A1 | 9/2014 | Amine et al. | |
| 2015/0098167 A1 | 4/2015 | El-Kady et al. | |
| 2015/0235776 A1 | 8/2015 | Miller | |
| 2015/0243920 A1* | 8/2015 | Edman | H01L 51/5016 257/13 |
| 2015/0243965 A1* | 8/2015 | Ishikawa | H01M 4/13 427/58 |
| 2015/0340729 A1* | 11/2015 | Ko | H01M 10/0413 429/152 |
| 2016/0133395 A1 | 5/2016 | Yoo et al. | |
| 2016/0172123 A1 | 6/2016 | Yang et al. | |

OTHER PUBLICATIONS

Arthur, Timothy S., et al. "Three-dimensional electrodes and battery architectures." Mrs Bulletin 36.07 (2011): 523-531.

Jones, "The state of solid-state batteries," American Ceramic Society Bulletin, vol. 91, No. 2, Mar. 2012.

Kutbee, et al, "Free-form Flexible Lithium-Ion Microbattery," IEEE Transactions on Nanotechnology (vol. 15, Issue: 3, May 2016 ).

Ribeiro, "Solid-state thin-films lithium batteries for integration in microsystems," In book: Scanning Probe Microscopy in Nanoscience and Nanotechnology 3, Chapter: 20, Publisher: Springer-Verlag Berlin Heidelberg, Editors: B. Bhushan, pp. 575-619, Jan. 2013 DOI: 10.1007/978-3-642-25414-7_20.

Long, J. W., et al. Three-dimensional battery architectures. Chem. Rev. 104, 4463-4492 (2004).

Ning, Hailong, et al. "Holographic patterning of high-performance on-chip 3D lithium-ion microbatteries." Proceedings of the National Academy of Sciences 112.21 (2015): 6573-6578.

Oudenhoven, Jos FM, Loïc Baggetto, and Peter HL Notten. "All-Solid-State Lithium-Ion Microbatteries: A Review of Various Three-Dimensional Concepts." Advanced Energy Materials 1.1 (2011): 10-33.

Pikul, J. H. et al. High-power lithium ion microbatteries from interdigitated three-dimensional bicontinuous nanoporous electrodes. Nat. Commun. 4:1732 doi: 10.1038/ncomms2747 (2013).

Sun, Ke, et al. "3D printing of interdigitated Li-Ion microbattery architectures." Advanced Materials 25.33 (2013): 4539-4543.

El-Kaby, "Scalable fabrication of high-power graphene microsupercapacitors for flexible and on-chip energy storage", Nature Communications, 2013, 4, 1475.

El-Kady, "Engineering three-dimentional hybrid supercapacitors and microsupercapacitors for high-performance integrated energy storage", PNAS 2015 112 (14) 4233-4238).

International Preliminary Report on Patentability for PCTUS2015056116.

International Search Report for PCTUS2015056116.

Wu, "Graphene-based in-plane micro-supercapacitors with high power and energy densities", Nature Communications, 2013, 4, 2487.

Zhiwei Peng et al. "Flexible and Stackable Laser Induced Graphene Supercapacitors" ACS Appl. Mater. Interfaces, 2015, 7 (5), pp. 3414-3419.

* cited by examiner

PRINTED PLANAR LITHIUM-ION BATTERIES

BACKGROUND OF THE INVENTION

Field of the Invention

This invention relates generally to rechargeable batteries, and, more specifically, to planar lithium-ion microbatteries, and low-cost, high throughput methods of making same.

There continues to be a need to increase the energy density of lithium-ion ion batteries for a wide range of applications, including portable devices, electric vehicles, and grid storage. From 1995 to 2014, energy density grew at an annual pace of only 6%, while the demand for energy storage has grown at a far faster pace. For example, an iPhone® 6 introduced in 2014 is about 50 times faster than the first iPhone® introduced in 2007, yet the energy density of commonly-used batteries has grown by only about 30% over the same period. In order to satisfy the demands for yet higher energy densities, advanced electrochemically active materials are being developed. Examples include the development of cathodes that use sulfur and oxygen (i.e., for lithium-sulfur and lithium-air batteries, respectively) and silicon and lithium metal for the anodes (i.e., for lithium-silicon and lithium-air batteries, respectively). These newer generations of Li ion battery materials promise to deliver energy densities of more than 800 Wh/kg, about a 200% improvement.

In addition to developing advanced battery materials, new battery architectures are being developed, such as batteries that have 3D structures. A defining characteristic of such 3-D batteries is that, at the microscopic level, they have short ion transport distances between electrodes similar to conventional, parallel-plate batteries, but the electrodes are configured in more complex, nonplanar (3D) geometries (e.g., interdigitated arrays of electrodes) in order to increase the energy density of the cell. Improvements in energy per unit area and high-rate discharge capabilities are two of the benefits that are being realized for such 3-D cells. Nevertheless, the fabrication of 3D structures has been extremely complicated. Mass production of 3D cells has been cost prohibitive, especially for large scale application such as EV and grid storage. As a result, their applications have been limited to micro-batteries.

What is needed is a novel 3D battery design suitable for large format batteries, which can be manufactured easily and cost-effectively.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

In one embodiment of the invention, a planar microbattery cell array is disclosed. The array includes a plurality of devices arranged parallel to one another on a substrate. Each device has a positive electrode and a positive current collector layer that is in contact with at least a portion of a first sidewall of the positive electrode and optionally some or all of the top surface of the positive electrode. Each device also has a negative electrode parallel to the positive electrode and a negative current collector layer in contact with at least a portion of a second sidewall of the negative electrode and optionally some or all of the top surface of the negative electrode. The second sidewall of the negative electrode faces away from the positive electrode. There is also an electrolyte in contact with both the positive electrodes and the negative electrodes. Within the plurality of devices, the positive electrode current collector layer has a first comb structure, and the negative electrode current collector layer has a second comb structure, and the first comb structure and the second comb structure are arranged in an interdigitated configuration.

In one arrangement, there is also a first set of metal grid lines in electronic communication with the positive current collector and a second set of metal grid lines in electronic communication with the negative current collector. One or more sets of grid lines may include a metal such as silver, gold, aluminum, copper, stainless steel, tin, and nickel. The grid lines may be deposited after the current collectors are deposited. In another arrangement, the grid lines are deposited onto the substrate before any other elements of the planar microbattery cell array are deposited. Etched lines may be made into the working surface of the substrate, and then a metal ink is printed into the etched lines to form the metal grid lines, which do not extend above the surface of the substrate. Alternatively, the metal grid lines may be deposited directly onto the working surface of substrate.

In one arrangement, in at least a portion of the planar microbattery cell array, each positive electrode is positioned between a positive electrode and a negative electrode, and each negative electrode is positioned between a positive electrode and a negative electrode. In another arrangement, in at least a portion of the planar microbattery cell array, each positive electrode is positioned between two negative electrodes, and each negative electrode is positioned between two positive electrodes.

The substrate may be a material such as paper, plastic, glass, ceramic, or silicon. The substrate may have a polymer buffer layer or an oxygenated layer between the substrate and the device array.

In one arrangement, the positive electrode comprises a material selected from the group consisting of lithium cobalt oxide, lithium nickel manganese cobalt oxide, lithium iron phosphate, lithium manganese oxide, lithium titanate, vanadium pentoxide, manganese dioxide, cobalt oxide, titanium oxide, manganese dioxide, lead oxide, and mixtures thereof. The positive electrode may also include a binder and/or a conductive additive. The binder may be polyvinylidene fluoride, copolymers of polyvinylidene fluoride, styrene-butadiene rubber, carboxymethyl cellulose, lithium dodecyl sulfate, polyethylene glycol, and/or mixtures thereof. The conductive additive may be any of, graphene, graphite, acetylene black, carbon black, and carbon nanotubes. The negative electrode may include any of graphite, graphene, silicon, silicides, lithium titanate, titania, lithium, aluminum, zinc, magnesium, yttrium, transition metal oxides, and mixtures thereof. The positive electrode and the negative electrode may each have a thickness between about 0.01 µm and 1000 µm.

The positive electrode current collector layer and the negative electrode current collector layer may each include a metal selected independently from the group consisting of silver, gold, aluminum, copper, stainless steel, tin, and nickel. The positive electrode current collector layer and/or the negative electrode current collector layer may include metal nanowires, metal nanoparticles, or mixtures thereof. In one arrangement, the positive electrode current collector layer and/or the negative electrode current collector layer includes silver nanowires and graphene.

The electrolyte may be any of aqueous liquid electrolytes, organic liquid electrolytes, polymer gel electrolytes, solid polymer electrolytes, and solid inorganic-organic hybrid electrolytes.

In another embodiment of the invention, a planar battery cell is disclosed. The battery has a positive electrode and a positive current collector layer that is in contact with at least a portion of a first sidewall of the positive electrode and optionally some or all of the top surface of the positive electrode. The battery also has a negative electrode parallel to the positive electrode and a negative current collector layer in contact with at least a portion of a second sidewall of the negative electrode and optionally some or all of the top surface of the negative electrode. The second sidewall of the negative electrode faces away from the positive electrode. There is also an electrolyte in contact with both the positive electrode and the negative electrode. In one arrangement, there is also a first metal grid line in electronic communication with the positive current collector and a second metal grid line in electronic communication with the negative current collector. The grid lines may be deposited after the current collectors are deposited. In another arrangement, the grid lines are deposited onto the substrate before any other elements of the planar microbattery cell array are deposited. Etched lines may be made into the working surface of the substrate, and then a metal ink is printed into the etched lines to form the metal grid lines, which do not extend above the surface of the substrate. Alternatively, the metal grid lines may be deposited directly onto the working surface of substrate.

In another embodiment of the invention, a method of making a planar microbattery cell array, involves the steps of:
  a. providing a substrate that has a working surface;
  b. depositing an array of positive electrode lines onto the working surface of the substrate, wherein the positive electrode lines are parallel to one another;
  c. depositing an array of negative electrode lines onto the working surface of the substrate, wherein the negative electrode lines are parallel to the positive electrode lines;
  d. depositing a first metal ink onto a portion of each positive electrode line to form a positive electrode current collector in contact with the array of positive electrode lines;
  e. depositing a second metal ink onto a portion of each negative electrode line to form a negative electrode current collector in contact with the array of negative electrode lines; and
  f. applying an electrolyte over the substrate wherein the electrolyte is in contact with the positive electrode lines and the negative electrode lines.

In other arrangements, either between step e) and step f) or between step a) and step b), there is an additional step of depositing a third metal ink metal onto the working surface of the substrate to form a first set of metal grid lines that make contact to the positive electrode current collector and a second set of metal grid lines that make contact to the negative electrode current collector.

At least one of the first metal ink, the second metal ink, and the third metal ink may include metal nanoparticles, metal nanowires, or metal complex precursors. The metal nanoparticles, metal nanowires, or metal complex precursors may include one or more of silver, gold, aluminum, copper, stainless steel, and nickel. Two or more of the first metal ink, the second metal ink, and the third metal ink may be the same.

Printing at least one of the first metal ink, the second metal ink and the third metal ink may involve a method such as inkjet printing, Gravure printing, flexo printing, offset printing, microcontact printing, screen printing, coextrusion printing and combinations thereof.

Depositing an array of positive electrode lines may involve using a positive electrode ink to print the positive electrode lines. The positive electrode ink may include positive electrode active material particles, conductive additives, binder, and solvent. The positive electrode active material particles may be any of lithium cobalt oxide, lithium nickel manganese cobalt oxide, lithium iron phosphate, lithium manganese oxide, lithium titanate, vanadium pentoxide, manganese dioxide, cobalt oxide, titanium oxide, manganese dioxide, cobalt oxide, titanium oxide, lead oxide, and mixtures thereof.

Depositing an array of negative electrode line may involve using a negative electrode ink to print the negative electrode lines. The negative electrode ink may include negative electrode active material particles, conductive additives, binder, and solvent. The negative electrode active material particles may be any of graphite, graphene, silicon, silicides, lithium titanate, titania, lithium, aluminum, zinc, magnesium, yttrium, transition metal oxides, and mixtures thereof.

In one arrangement, the positive electrode lines and the negative electrode lines are positioned so that each positive electrode line is between two negative electrode lines, and each negative electrode line is between two positive electrode lines. In another arrangement, the positive electrode lines and the negative electrode lines are positioned so that each positive electrode line is between a positive electrode line and a negative electrode line, and each negative electrode line is between a negative electrode line and a positive electrode line.

The working surface of the substrate may be a surface that has been prepared with a polymer buffer layer, an oxygen plasma treatment, an ultraviolet ozone treatment, or any combination thereof.

In one arrangement, steps d) and e) are performed at the same time.

The electrolyte may be any of aqueous liquid electrolytes, organic liquid electrolytes, polymer gel electrolytes, solid polymer electrolytes, and solid inorganic-organic hybrid electrolytes.

DETAILED DESCRIPTION

The preferred embodiments are illustrated in the context of planar microbatteries and using a printing process to manufacture same. The skilled artisan will readily appreciate, however, that the materials and methods disclosed herein will have application in a number of other contexts where high-throughput manufacturing is desirable, particularly where low cost is important.

These and other objects and advantages of the present invention will become more fully apparent from the following description taken in conjunction with the accompanying drawings.

All publications referred to herein are incorporated by reference in their entirety for all purposes as if fully set forth herein. All ranges of values disclosed herein also contain any range subsumed therein.

In this disclosure, the terms "negative electrode" and "anode" are both used to mean "negative electrode". Likewise, the terms "positive electrode" and "cathode" are both used to mean "positive electrode".

High throughput printing approaches to manufacture large format planar microbatteries (PLMs) are disclosed. Such methods yield planar microbatteries with excellent performance characteristics such as enhanced stability, reduced leakage current, and improved ion transport.

For any of the embodiments described herein, some surfaces have been described as top surfaces. It should be noted that the designation of top is related to the figures as drawn, and may be more strictly defined as the surface that faces away from the substrate.

In some embodiments of the invention, a planar microbattery cell array or a planar microbattery cell has lithium-based electrochemistry. The planar microbattery cell arrays or planar microbattery cells may contain lithium-ion battery cells.

Figure 1A:
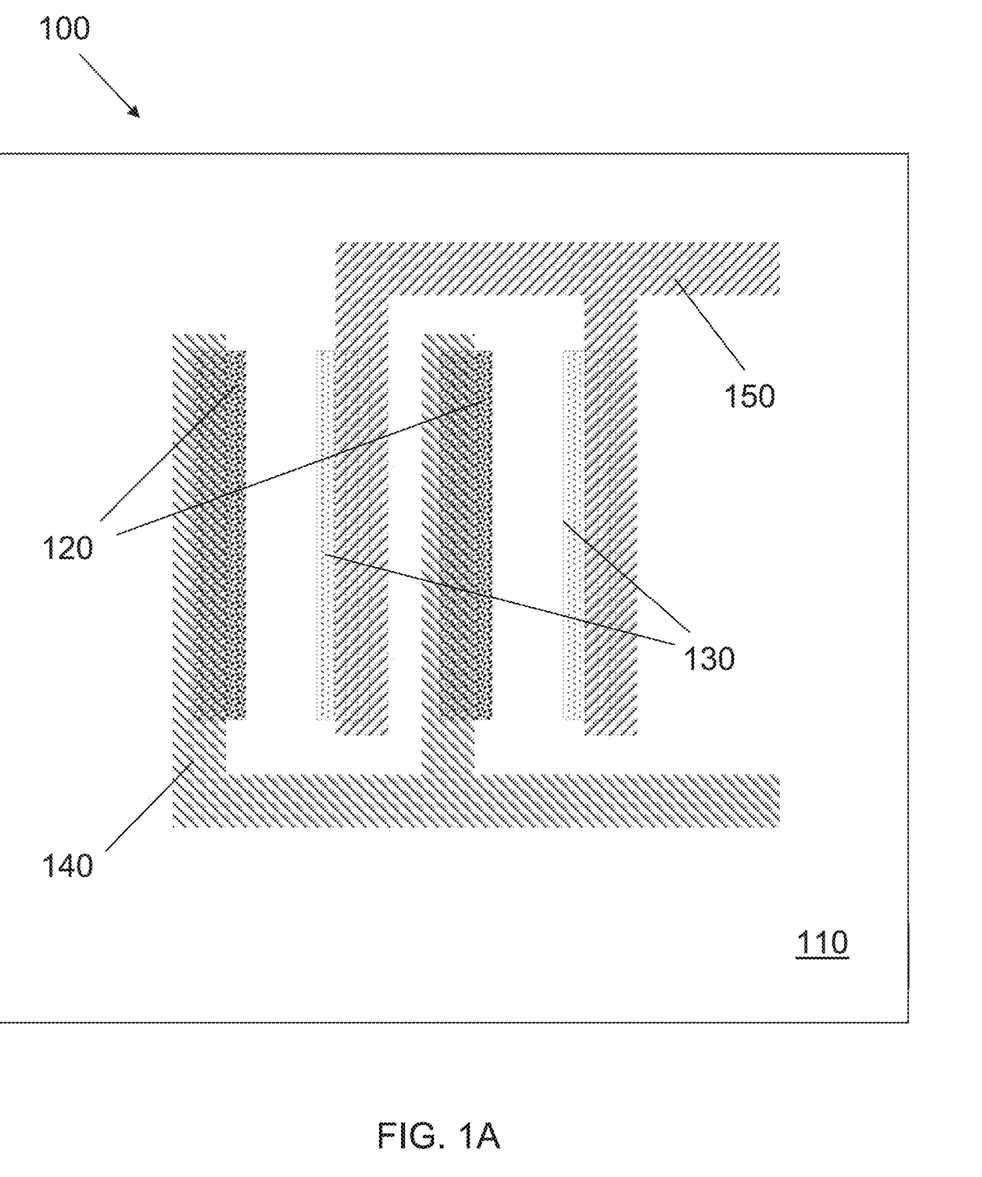
FIG. 1A is a plan-view and FIG. 1B is a cross-section schematic illustration of planar microbattery cell array, according to an embodiment of the invention.

FIG. 1A is a plan-view illustration of a portion of a planar microbattery cell array 100 on a working surface of a substrate 110, according to an embodiment of the invention. The working surface of the substrate 110 is the surface of the substrate 110 onto which the planar microbattery cell array 100 is formed. FIG. 1A shows two positive electrodes (lines) 120 arranged parallel to one another and two negative electrodes (lines) 130 arranged parallel to one another. There can be any number of positive and negative electrodes on the substrate 110 arranged as those shown in FIG. 1A. There is a positive current collector 140 on the substrate 110, which has a comb structure that has one finger or line associated with each positive electrode 120. There is a negative current collector 150 on the substrate 110, which also has a comb structure that has one finger or line associated with each negative electrode 130. The positive current collector 140 and the negative current collector 150 are interdigitated, that is they are interlocked, as the fingers of two clasped hands. The positive current collector 140 and the negative current collector 150 may provide electronic communication between the planar microbattery cell array 100 and an outside load. Examples of useful materials for the current collectors 140, 150 include metals such as silver, gold, aluminum, copper, stainless steel, tin, and nickel. In one arrangement, one or both current collectors 140, 150 contain silver nanowires and graphene. In one arrangement, the positive electrodes 120 and the negative electrodes 130 have been printed onto the substrate 110 using inks designed for the purpose. In one arrangement, the current collectors 140, 150 have been printed onto the positive electrodes 120 and the negative electrodes 130 and the substrate 110. There can be any number of fingers in the current collectors 140, 150, corresponding to the number of positive electrodes 120 and negative electrodes, 130, respectively. In some arrangements, the working surface (the surface of the substrate 110 onto which the planar microbattery cell array 110) of the substrate 110 is treated with a polymer buffer layer coating, an oxygen plasma treatment or an ultraviolet ozone treatment or some combination of these before any lines are printed, in order to ensure good adhesion and enhanced printability.

Figure 1B:
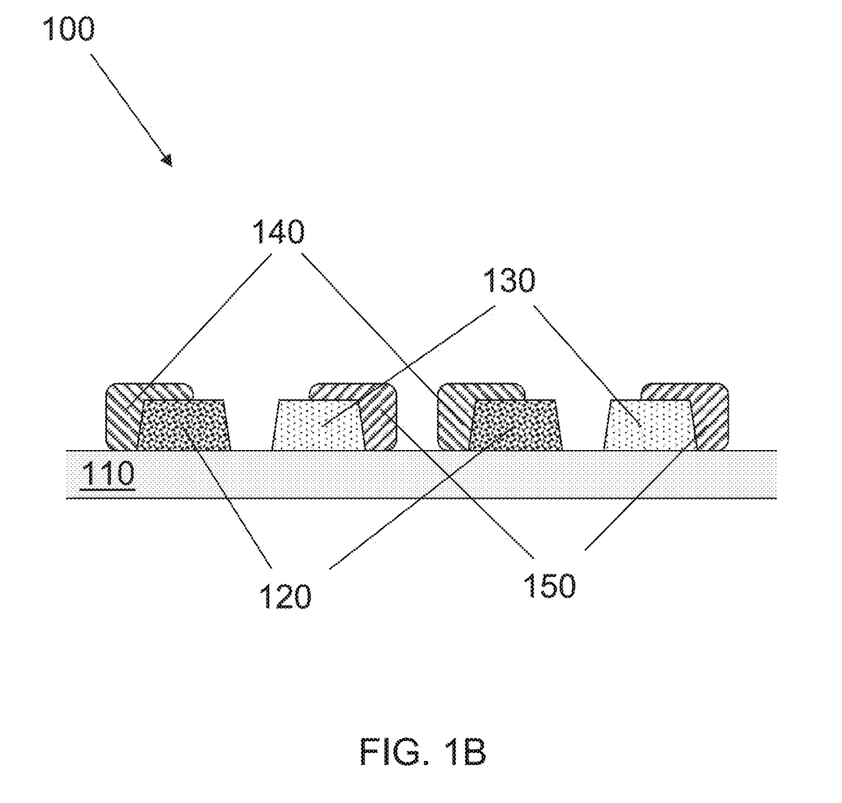

FIG. 1B is a cross-section schematic illustration of the array 100 of FIG. 1A. The positive electrodes 120 and the negative electrodes 130 are seen on the substrate 110. The working surface of the substrate 110 is the surface of the substrate 110 onto which electrode and current collector lines are printed. In some arrangements, both sides of the substrate 110 can be working surfaces with electrode and current collector lines printed on both sides.

The fingers or lines of the positive current collector 140 and the fingers or lines of the negative current collector 150 are also shown in FIG. 1B. It can be seen that the lines or fingers of the positive current collector 140 are in contact with the lines of the positive electrode 120, and that the lines or fingers of the negative current collector 150 are in contact with the lines of the negative electrode 130. In the arrangement shown in FIG. 1B, the current collectors 140, 150 cover entirely one sidewall of each electrode line 120, 130, respectively. In other arrangements, the current collectors 140, 150 cover only a portion of the sidewall of one or both electrode lines 120, 130, respectively. In the arrangement shown in FIG. 1B, the current collectors 140, 150 also cover a portion of the top surface of one or both electrode lines 120, 130, respectively. In other arrangements, the current collectors 140, 150 do not extend at all onto the top surface of one or both electrode lines 120, 130, respectively. In yet other arrangements, the current collectors 140, 150 completely cover the top surface of one or both electrode lines 120, 130, respectively.

Both FIGS. 1A and 1B show that for any pair of adjacent positive and negative electrodes 120, 130, respectively, the sidewalls that face one another are either both have no current collector or the positive electrode 120 is covered with the positive current collector layer 140 and the negative electrode 130 is covered with the negative current collector layer 150. There is also an electrolyte layer (not shown) over the structures shown in FIGS. 1A and 1B, at least between the positive electrodes 120 and the negative electrodes 130. The electrolyte may be a solid or gel polymer electrolyte.

Figure 2:
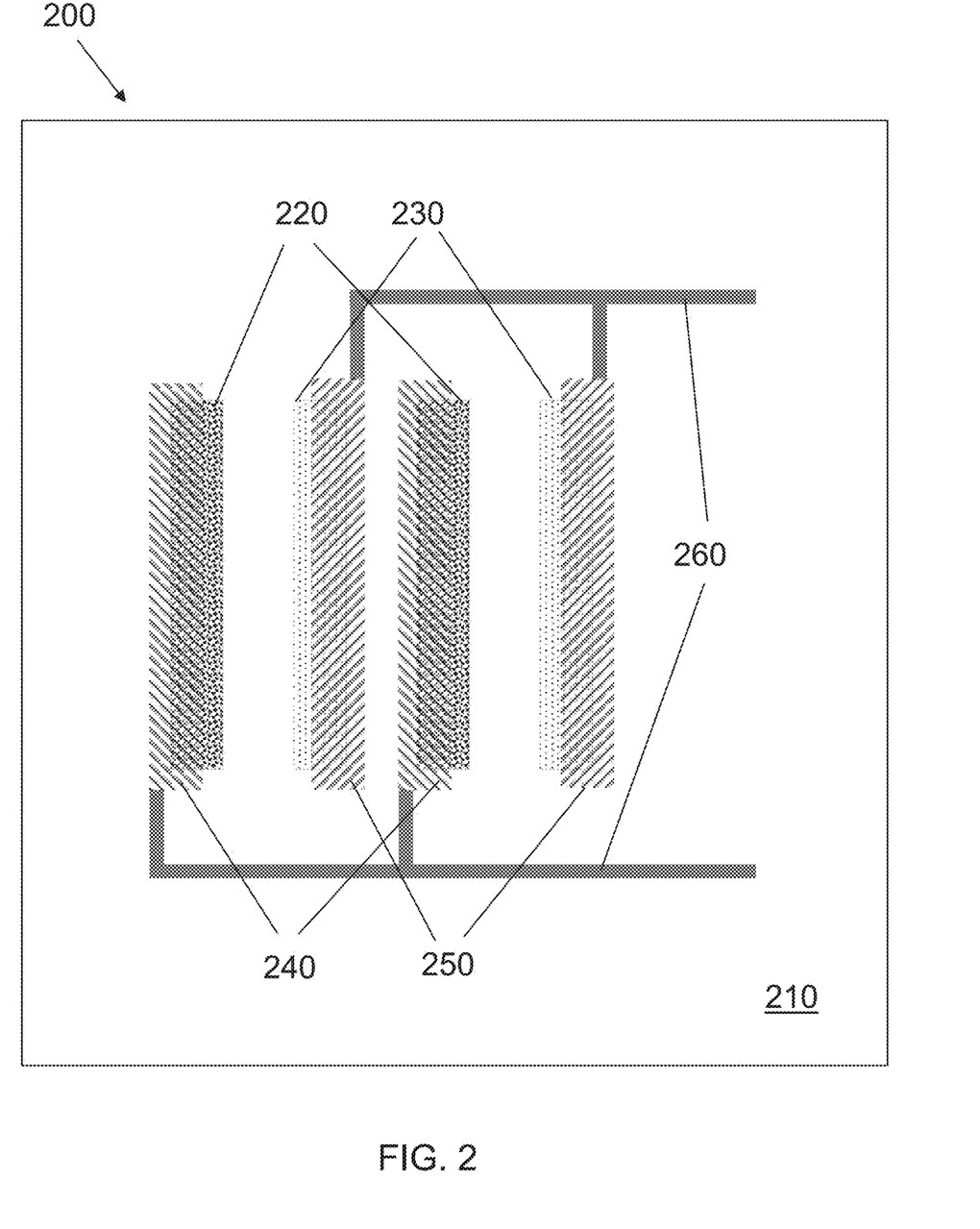
FIG. 2 is a plan-view illustration of a portion of a planar microbattery cell array, according to another embodiment of the invention.

FIG. 2 is a plan-view illustration of a portion of a planar microbattery cell array 200 on a working surface of a substrate 210, which is a variation of the array shown in FIGS. 1A and 1B, according to another embodiment of the invention. FIG. 2 shows two positive electrodes (lines) 220 arranged parallel to one another and two negative electrodes (lines) 230 arranged parallel to one another. There can be any number of positive and negative electrodes arranged on the substrate 210 as those shown in FIG. 2A. There are two positive current collector lines 240 on the substrate 210 arranged so that one current collector line 240 is in contact with each positive electrode 220 line. There are two negative current collector lines 250 on the substrate 210 arranged so that one current collector line 250 is in contact with each negative electrode 230 line. Examples of useful materials for the current collectors have been described above. There are also metal grid lines 260, one of which makes electrical contact to the positive current collector lines 240, and another of which makes contact to the negative current collector lines 250. The metal grid lines 260 may provide electronic communication between the microbattery cell array 200 and an outside load. In one arrangement, the metal grid lines 260 are deposited onto the working surface of the substrate 210 after the current collector lines 240, 250 are deposited. In another arrangement, the metal grid lines 260 are deposited onto the working surface of the substrate 210 before any other structures are deposited. Etched lines may be made into the working surface of the substrate 210, and then a metal ink is printed into the etched lines to form the metal grid lines 260, which do not extend above the surface of the substrate 210. Alternatively, the metal grid lines may be deposited directly onto the working surface of substrate 210. The current collectors themselves provide electronic communication with an outside load in the embodiment shown in FIG. 1A, but grid lines can be used instead and can reduce the area and weight of the current collectors. There can be any number of lines of current collectors 240, 250, corresponding to the number of lines of positive electrodes 220 and negative electrodes, 230, respectively. There is also an electrolyte layer (not shown) over the structures shown in FIG. 2, at least between the positive electrodes 220 and the negative electrodes 230. The electrolyte may be a solid or gel polymer electrolyte. In some arrangements, the working surface (the surface of the substrate 210 onto which the planar microbattery cell array 210 is formed) of the substrate 210 is treated with a polymer buffer layer coating, an oxygen plasma treatment or an ultraviolet ozone treatment or some combination of these before any lines are printed, in order to ensure good adhesion and enhanced printability.

Figure 3A:
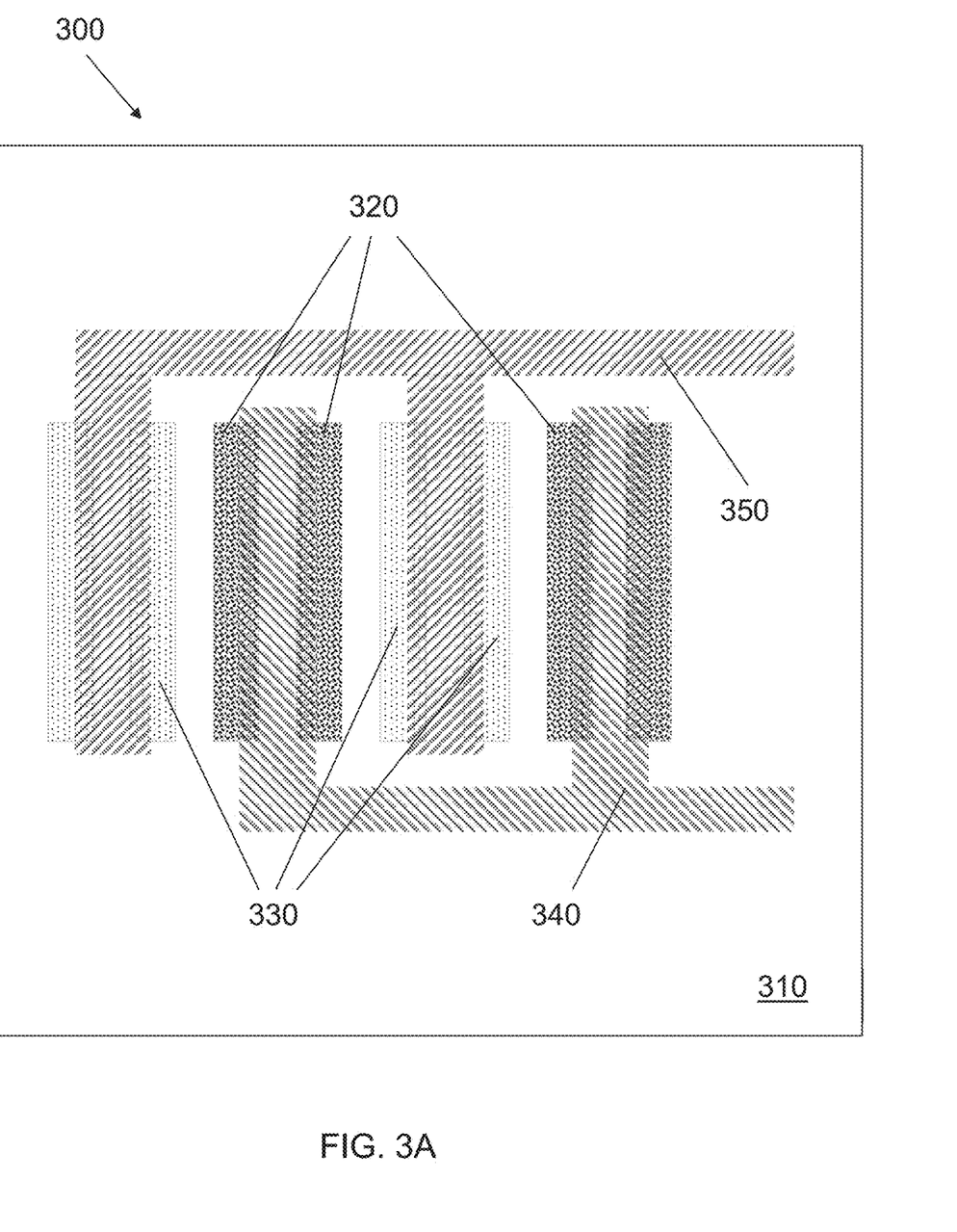
FIG. 3A is a plan-view and FIG. 3B is a cross-section schematic illustration of planar microbattery cell array, according to another embodiment of the invention.

FIG. 3A is a plan-view illustration of a portion of a planar microbattery cell array 300 on a working surface of a substrate 310, according to another embodiment of the invention. There are several positive electrodes 320 arranged parallel to one another and several negative electrodes 330 arranged parallel to one another. There can be any number of positive and negative electrodes on the substrate 310 arranged as those shown in FIG. 3A. There is a positive current collector 340 on the substrate 310, which has a comb structure in which each finger or line is in contact with two positive electrodes 320. There is a negative current collector 350 on the substrate 310, which also has a comb structure in which each finger or line is in contact with two negative electrodes 330. The positive current collector 340 and the negative current collector 350 are interdigitated, that is they are interlocked, as the fingers of two clasped hands. The positive current collector 340 and the negative current collector 350 may provide electronic communication between the microbattery cell array 300 and an outside load. In one arrangement, the positive electrodes 320 and the negative electrodes 330 have been printed onto the substrate 310 using inks designed for the purpose. In one arrangement, the current collectors 340, 350 have been printed onto the positive electrodes 320 and the negative electrodes 330. There can be any number of fingers in the current collectors 340, 350, according to the number of positive electrodes 320 and negative electrodes, 330, respectively. In some arrangements, the working surface (the surface of the substrate 310 onto which the planar microbattery cell array 310) of the substrate 310 is treated with a polymer buffer layer coating, an oxygen plasma treatment or an ultraviolet ozone treatment or some combination of these before any lines are printed, in order to ensure good adhesion and enhanced printability.

Figure 3B:
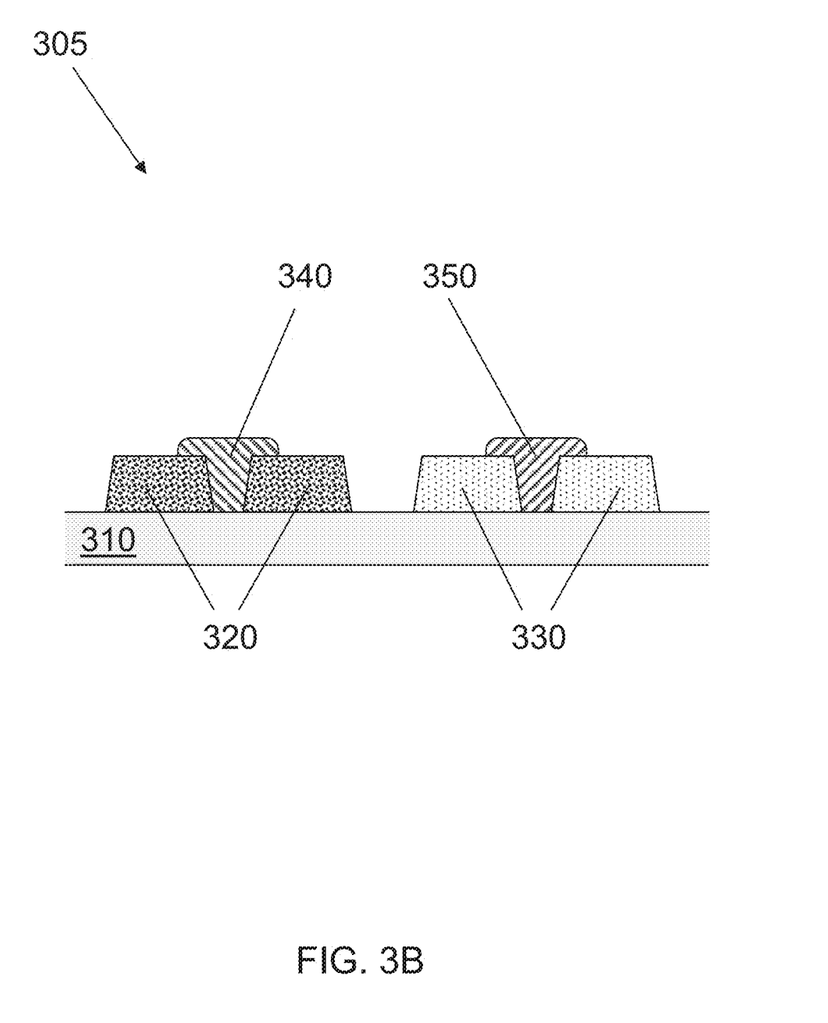

FIG. 3B is a cross-section schematic illustration of a portion 305 of the array 300 of FIG. 3A. Positive electrodes 320 and negative electrodes 330 are seen on the substrate 310. The working surface of the substrate 310 is the surface of the substrate 310 onto which electrode and current collector lines are printed. In some arrangements, both sides of the substrate 310 can be working surfaces with electrode and current collector lines printed on both sides.

One finger or line of the positive current collector 340 and one finger or line of the negative current collector 350 are also shown in FIG. 3B. It can be seen that the finger of the positive current collector 340 is in contact with two positive electrodes 320, and that the finger of the negative current collector 350 is in contact with two negative electrodes 330.

In the arrangement shown in FIG. 3B, the current collectors 340, 350 cover entirely one sidewall of each electrode line 320, 330, respectively. In other arrangements, the current collectors 340, 350 cover only a portion of the sidewall of one or both electrode lines 320, 330, respectively. In the arrangement shown in FIG. 3B, the current collectors 340, 350 also cover a portion of the top surface of one or both electrode lines 320, 330, respectively. In other arrangements, the current collectors 340, 350 do not extend at all onto the top surface of one or both electrode lines 320, 330, respectively. In yet other arrangements, the current collectors 340, 350 completely cover the top surface of one or both electrode lines 320, 330, respectively. There is also an electrolyte layer (not shown) over the structures shown in FIGS. 3A and 3B, at least between the positive electrodes 320 and the negative electrodes 330. The electrolyte may be a solid or gel polymer electrolyte.

Figure 4:
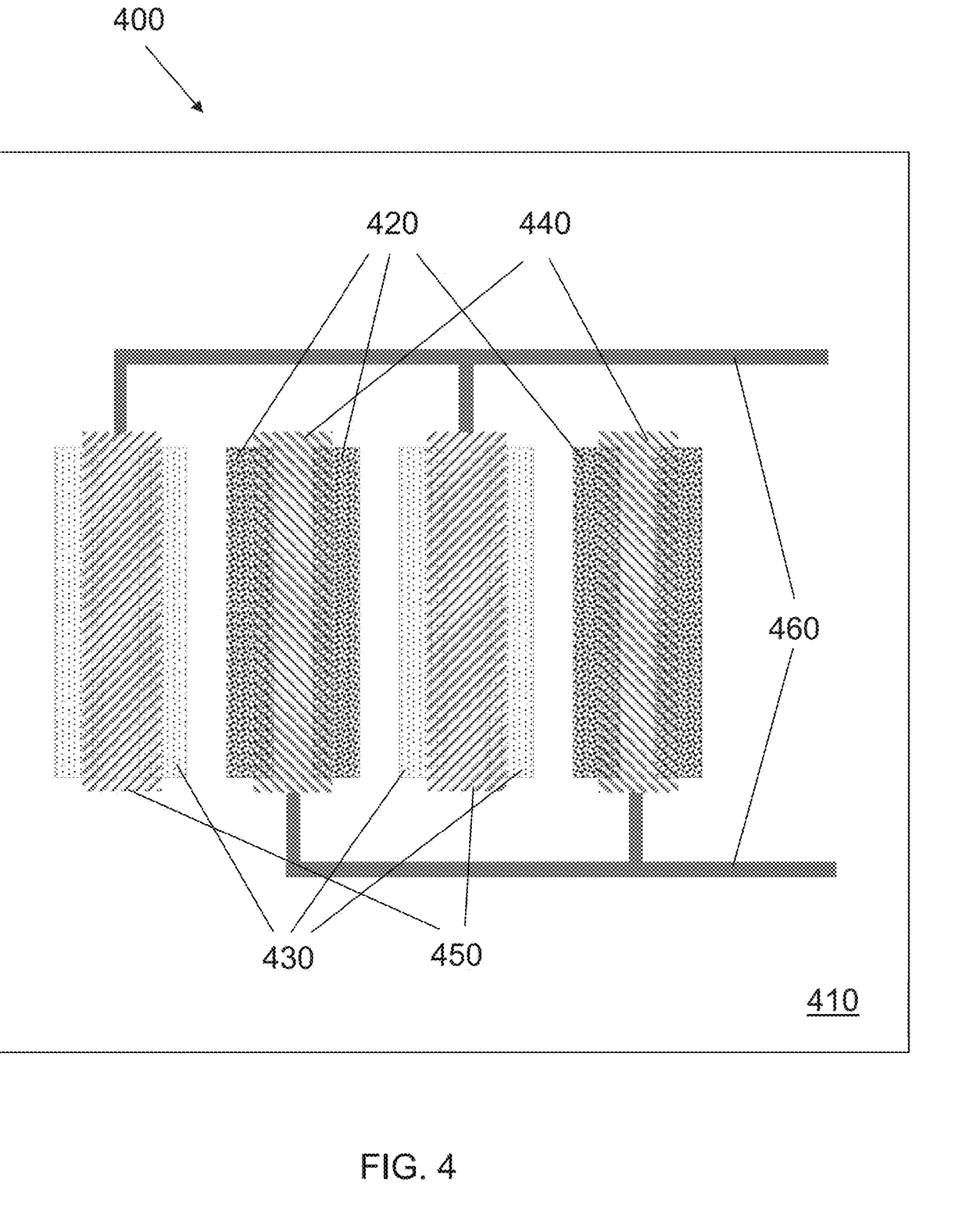
FIG. 4 is a plan-view illustration of a portion of a planar microbattery cell array, according to another embodiment of the invention.

FIG. 4 is a plan-view illustration of a portion of a planar microbattery cell array 400 on a working surface of a substrate 410, which is a variation of the array shown in FIGS. 3A and 3B, according to another embodiment of the invention. There are several positive electrodes 420 arranged parallel to one another and several negative electrodes 430 arranged parallel to one another. There can be any number of positive and negative electrodes on the substrate 410 arranged as those shown in FIG. 4A. There are two positive current collector lines 440 on the substrate 410 arranged so that one current collector line 440 is in contact with two positive electrode lines 420. There are two negative current collector lines 450 on the substrate 410 arranged so that one current collector line 450 is in contact with two negative electrode lines 430. There are also metal grid lines 460, one of which makes electrical contact to the positive current collector lines 440, and another of which makes contact to the negative current collector lines 460. The metal grid lines 460 may provide electronic communication between the microbattery cell array 400 and an outside load. In one arrangement, the metal grid lines 460 are deposited onto the working surface of the substrate 410 after the current collector lines 440, 450 are deposited. In another arrangement, the metal grid lines 460 are deposited onto the working surface of the substrate 410 before any other structures are deposited. Etched lines may be made into the working surface of the substrate 410, and then a metal ink is printed into the etched lines to form the metal grid lines 460, which do not extend above the surface of the substrate 410. Alternatively, the metal grid lines may be deposited directly onto the working surface of substrate 410. The current collectors themselves serve provide electronic communication with an outside load in the embodiment shown in FIG. 3A, but grid lines can be used instead and can reduce the area and weight of the current collectors. There can be any number of lines in the current collectors 440, 450, according to the number of positive electrodes 420 and negative electrodes, 430, respectively. There is also an electrolyte layer (not shown) over the structures shown in FIG. 4. The electrolyte may be a solid or gel polymer electrolyte. In some arrangements, the working surface (the surface of the substrate 410 onto which the planar microbattery cell array 410) of the substrate 410 is treated with a polymer buffer layer coating, an oxygen plasma treatment or an ultraviolet ozone treatment or some combination of these before any lines are printed, in order to ensure good adhesion and enhanced printability.

Figure 5:
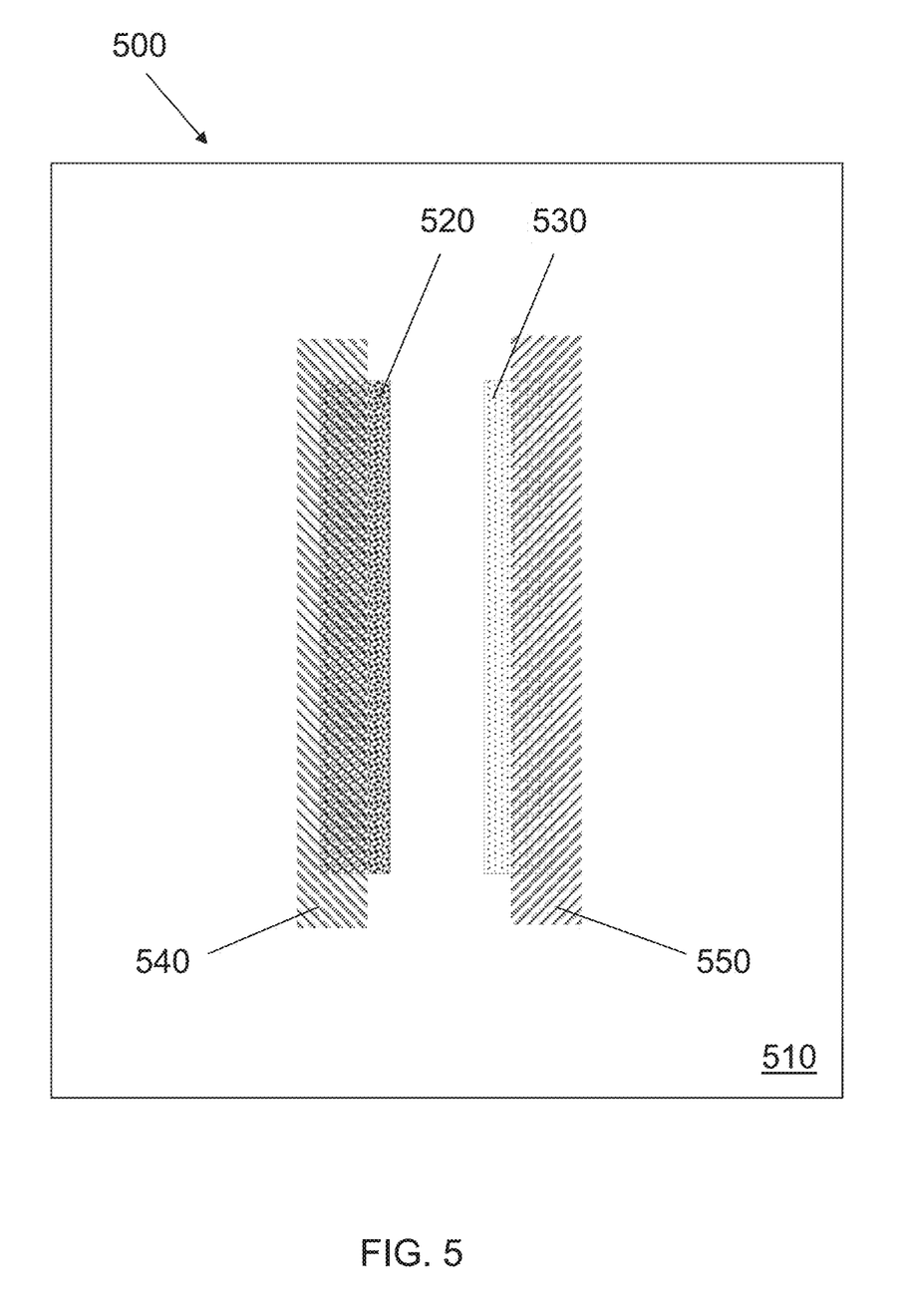
FIG. 5 is a plan-view illustration of a single planar microbattery cell, according to an embodiment of the invention.

FIG. 5 is a plan-view illustration of a single planar microbattery 500 on a working surface of a substrate 510, according to an embodiment of the invention. There is one positive electrode 520 arranged parallel to one negative electrode 530. There is a positive current collector line 540 in electronic communication with the positive electrode line 520. There is one negative current collector line 550 in electronic communication with the negative electrode line 530. Electronic communication with an outside load can be achieved either through extensions to the positive current collector line 540 and the negative current collector line 550 or through addition of metal grid lines (not shown), as has been discussed above in regard to microbattery cell arrays. There is also an electrolyte layer (not shown) over the structure shown in FIG. 5, at least between the positive electrode 520 and the negative electrode 530. The electrolyte may be a solid or gel polymer electrolyte. In some arrangements, the working surface (the surface of the substrate 510 onto which the planar microbattery cell array 510) of the substrate 510 is treated with a polymer buffer layer coating, an oxygen plasma treatment or an ultraviolet ozone treatment or some combination of these before any lines are printed, in order to ensure good adhesion and enhanced printability.

The substrates disclosed herein may be made of a material such as paper, plastic, glass, ceramic, or silicon. The plastic may be any of poly(methyl methacrylate), polycarbonate, polystyrene, polyether ether ketone, polyaryl sulphone, polypheneylene sulfide, polyethylene terephthalate, polyethylene naphthalate, and polyimide. In some arrangements, the working surface (the surface onto which electrode and current collector lines are printed) of the substrate is treated with a polymer buffer layer coating, an oxygen plasma treatment or an ultraviolet ozone treatment or some combination of these before any lines are printed, in order to ensure good adhesion and enhanced printability.

Examples of useful positive electrode materials include, but are not limited to, lithium cobalt oxide, lithium nickel manganese cobalt oxide, lithium iron phosphate, lithium manganese oxide, lithium titanate, vanadium pentoxide, manganese dioxide, cobalt oxide, titanium oxide, lead oxide vanadium pentoxide, manganese dioxide, cobalt oxide, titanium oxide, lead oxide, and mixtures thereof. The positive electrode may also include a binder and/or a conductive additive. Examples of useful binders include, but are not limited to, polyvinylidene fluoride, its copolymers, styrene-butadiene rubber, carboxymethyl cellulose, lithium dodecyl sulfate, polyethylene glycol, and mixtures thereof. Examples of useful conductive additives include, but are not limited to, graphene, graphite, acetylene black, carbon black, carbon nanotubes, and mixtures thereof. Exemplary compositions for inks that can be used to print positive electrodes are shown below in Table I.

TABLE I

Exemplary Positive Electrode Ink Compositions

| Component | Weight % | Examples |
|---|---|---|
| Positive Electrode Materials | 85-95% | lithium cobalt oxide, lithium nickel manganese cobalt oxide, lithium iron phosphate, lithium manganese oxide, lithium titanate, vanadium pentoxide, manganese dioxide, cobalt oxide, titanium oxide, manganese dioxide, lead oxide, and mixtures thereof |
| Conductive Additives | 5-10% | graphite, carbon black, acetylene black, carbon nanotubes, graphene, and mixtures thereof |
| Binders | 2-8% | polyvinylidene fluoride, copolymers of polyvinylidene fluorides, styrene-butadiene rubber, carboxymethyl cellulose, lithium dodecyl sulfate, polyethylene glycol, and mixtures thereof |
| Solvents | 0.5 to 5 times the total weight of the solid components listed above | n-methylpyrrolidone, ethylene carbonate, acetonitrile, nitromethane, toluene, and mixtures thereof |

Examples of useful negative electrode materials include, but are not limited to, graphite, graphene, silicon, silicides, lithium titanate, titania, lithium, aluminum, zinc, magnesium, yttrium, transition metal oxides, and mixtures thereof. Exemplary compositions for inks that can be used to print negative electrodes are shown below in Table II.

TABLE II

Exemplary Negative Electrode Ink Compositions

| Component | Weight % | Examples |
|---|---|---|
| Negative Electrode Active Material | 85-95% | graphite, graphene, silicon, silicides, lithium titanate, titania, lithium, aluminum, zinc, magnesium, yttrium, transition metal oxides, and mixtures thereof |
| Conductive Additives | 5-10% | graphite, carbon black, acetylene black, carbon nanotubes, graphene, and mixtures thereof |
| Binders | 2-8% | polyvinylidene fluoride, its copolymers, styrene-butadiene rubber, carboxymethyl cellulose, polyacrylic acid, its alkaline metal salts, sodium alginate, lithium dodecyl sulfate, polyethylene glycol, xanthan gum, and mixtures thereof |
| Solvents | 0.5 to 5 times the total weight of the solid components listed above | water, acetonitrile, n-methylpyrrolidone, methyl ethyl ketone, and mixtures thereof |

In one arrangement, the positive electrode and the negative electrode each has a thickness between about 0.01 μm and 1000 μm or between about 0.1 μm and 100 μm.

For any of the embodiments described herein, the current collector layers may be made of silver, gold, aluminum, copper, stainless steel, tin, or nickel. The current collector layers may be made of metal nanowires, metal nanoparticles, or combinations thereof. The current collector layers may be a mixture of silver nanowires, graphene and binder. For any of the embodiments described herein, the electrolyte may be any of aqueous liquid electrolytes, organic liquid electrolytes, ionic liquids and solids, polymer gel electrolytes, solid polymer electrolytes, solid inorganic-organic hybrid electrolytes, and combinations thereof.

In one embodiment of the invention, any of the microbattery cell arrays described with reference to FIGS. 1A, 2, 3A and 4 are arranged face-to-face to form a planar microbattery with a so-called sandwich geometry, as would be known to a person with ordinary skill in the art.

In some embodiments of the invention, the microbattery cell arrays described with reference to FIGS. 1A, 2, 3A and 4 are printed onto both sides of the substrate. Such double-sided devices can be stacked one on top of the other to form a planar microbattery with a prismatic geometry.

In yet other embodiments of the invention, when the substrate is flexible, single-sided or double sided microbattery cell arrays can be wound up to form planar microbatteries with cylindrical geometry.

In one embodiment of the invention, a method of making a planar microbattery array is provided. The method involves first providing a substrate that has a working surface onto which the planar microbattery array can be printed. The working surface may be prepared with a polymer buffer layer, an oxygen plasma treatment, an ultraviolet ozone treatment or any combination of these.

Arrays of parallel positive electrode lines and of parallel negative electrode lines are deposited onto the working surface of the substrate. In one arrangement, the lines are deposited by inkjet, Gravure, flexo, offset, microcontact, screen printing, and co-extrusion printing.

A first metal ink is used to print a positive electrode current collector in contact with the array of positive electrode lines. A second metal ink is used to print a negative electrode current collector in contact with the array of negative electrode lines. The positive electrode current collector and the negative electrode current collector form two interdigitated structures as described above. A third metal ink metal is used to print metal grid lines onto the working surface of the substrate. One set of metal grid lines makes contact to the positive electrode current collector(s) and another set of metal grid lines makes contact to the negative electrode current collector(s).

In another embodiment of the invention, another method of making a planar microbattery array is provided. The method involves first providing a substrate that has a working surface onto which the planar microbattery array can be printed. The working surface may be prepared with a polymer buffer layer, an oxygen plasma treatment, an ultraviolet ozone treatment or any combination of these. First the third metal ink is used to print metal grid lines onto the working surface of the substrate. In one arrangement, the third metal ink is printed directly onto the working surface of the substrate to form the metal grid lines. In another arrangement, etched lines are first made into the working surface of the substrate and then the third metal ink is printed into the etched lines to form metal grid lines that are essentially at or below the working surface of the substrate, as is typically used in printed circuit board manufacturing.

Arrays of parallel positive electrode lines and of parallel negative electrode lines are deposited onto the working surface of the substrate and not in contact with the metal grid lines. In one arrangement, the lines are deposited by inkjet, Gravure, flexo, offset, microcontact, screen printing, and co-extrusion printing. Then a first metal ink is used to print a positive electrode current collector in contact with the array of positive electrode lines and a first portion of the metal grid lines. A second metal ink is used to print a negative electrode current collector in contact with the array of negative electrode lines and a second portion of the metal grid lines, different from the first portion. The positive electrode current collector and the negative electrode current collector form two interdigitated structures as described above.

Some or all of the metal inks may be the same. Any metal ink may contain metal nanoparticles, metal nanowires, or metal complex precursors, which may include one or more metals selected from silver, gold, aluminum, copper, stainless steel, tin, and nickel. After the metal current collectors are printed, the substrate is heat treated. An exemplary heat treatment involves heating to a temperature between 150 and 300° C. for between 1 and 120 minutes. Finally, an electrolyte is applied over the current collectors and electrodes.

Figure 6A:
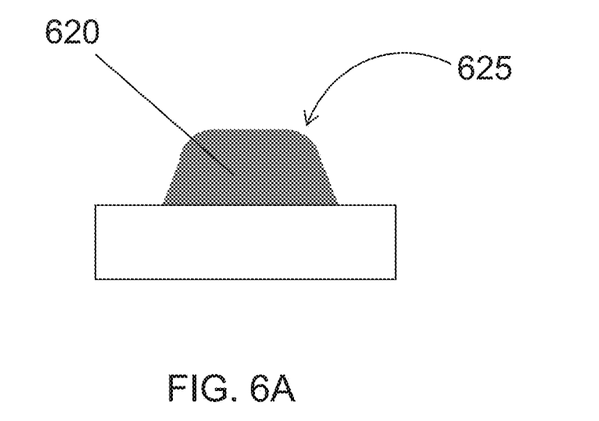
FIG. 6A is a cross-section view of a positive or a negative electrode line that has been made using a printing method.
Figure 6B:
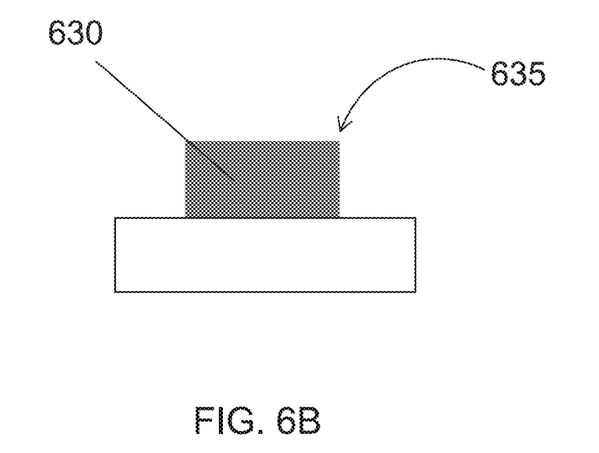
FIG. 6B is a cross-section view of a positive or a negative electrode line that has been made using a masking and etching method.

Printing the metal ink may involve inkjet, Gravure, flexo, offset, microcontact, screen, co-extrusion printing or a combination of these. There is an artifact of printing methods that may not be present in more traditional masking and etching processes. In general, printing processes yield cross-section profiles that do not have sharp corners, but are somewhat rounded. Some printing methods generally yield lines that have cross-section profiles such as that show by 620 in FIG. 6A. Note that the profiles are trapezoidal with rounded corners 625. Other printing processes may yield other cross-section profiles, such as semicircular. In contrast, masking and etching processes generally yield lines that have sharp cross-section profiles such as that show by 630 in FIG. 6B. Note that the corners 635 of the cross section are square. The rounded corners 625 of the printed line profiles provide a more even distribution of electric field strength than for the square corners 635 of masked and etched lines where electric field strength is highly concentrated. A more even electric field strength distribution may offer advantages in higher efficiency and longer lifetime.

For all methods, additional steps may involve making sandwiches of such devices. In one embodiment, the process described above is also performed on the opposite side of the substrate. Such processed substrates can be stacked together to form prismatic planar microbatteries. In another arrangement, the substrate is flexible and it can be wound into a "jelly roll" shape and optionally placed into a canister.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

I claim:

1. A planar microbattery cell array comprising:
   a plurality of devices arranged parallel to one another on a substrate, wherein each device comprises;

a positive electrode, having an upper surface, a lower surface in contact with the substrate, a first sidewall, and a second sidewall, wherein the first sidewall and the second sidewall are opposite to one another;

a positive current collector layer in contact with at least a portion of the first sidewall of the positive electrode and optionally some or all of the top surface of the positive electrode;

a negative electrode parallel to the positive electrode, the negative electrode having an upper surface, a lower surface in contact with the substrate, and a first sidewall, and a second sidewall, wherein the first sidewall and the second sidewall are opposite to one another; and a negative current collector layer in contact with at least a portion of the second sidewall of the negative electrode and optionally some or all of the top surface of the negative electrode, the second sidewall of the negative electrode facing away from the positive electrode; and an electrolyte in contact with both the positive electrodes and the negative electrodes;

wherein, within the plurality of devices, the positive electrode current collector layer has a first comb structure, and the negative electrode current collector layer has a second comb structure, and the first comb structure and the second comb structure are arranged in an interdigitated configuration.

2. The planar microbattery cell array of claim 1, further comprising a first set of metal grid lines in electronic communication with the positive current collector and a second set of metal grid lines in electronic communication with the negative current collector.

3. The planar microbattery cell array of claim 1 wherein, in at least a portion of the planar microbattery cell array, each positive electrode is positioned between a positive electrode and a negative electrode, and each negative electrode is positioned between a positive electrode and a negative electrode.

4. The planar microbattery cell array of claim 1 wherein, in at least a portion of the planar microbattery cell array, each positive electrode is positioned between two negative electrodes, and each negative electrode is positioned between two positive electrodes.

5. The planar microbattery cell array of claim 1, wherein the substrate comprises a material selected from the group consisting of paper, plastic, glass, ceramic, and silicon.

6. The planar microbattery cell array of claim 1, wherein the substrate further comprises a polymer buffer layer or an oxygenated layer, and the polymer buffer layer or the oxygenated layer lies between the substrate and the device array.

7. The planar microbattery cell array of claim 1, wherein the positive electrode comprises a material selected from the group consisting of lithium cobalt oxide, lithium nickel manganese cobalt oxide, lithium iron phosphate, lithium manganese oxide, lithium titanate, vanadium pentoxide, manganese dioxide, cobalt oxide, titanium oxide, manganese dioxide, lead oxide, and mixtures thereof.

8. The planar microbattery cell array of claim 1 wherein the negative electrode comprises a material selected from the group consisting of graphite, graphene, silicon, silicides, lithium titanate, titania, lithium, aluminum, zinc, magnesium, yttrium, transition metal oxides, and mixtures thereof.

9. The planar microbattery cell array of claim 1, wherein the positive electrode and the negative electrode each has a thickness between about 0.01 µm and 1000 µm.

10. A planar battery cell comprising:
a positive electrode, having an upper surface, a lower surface in contact with the substrate, a first sidewall, and a second sidewall, wherein the first sidewall and the second sidewall are opposite to one another;

a positive electrode current collector layer in contact with at least a portion of the first sidewall and optionally some or all of the top surface of the positive electrode;

a negative electrode parallel to the positive electrode, the negative electrode having an upper surface, a lower surface in contact with the substrate, and a first sidewall, and a second sidewall, wherein the first sidewall and the second sidewall are opposite to one another; and a negative electrode current collector layer in contact with at least a portion of the second sidewall of the negative electrode and optionally some or all of the top surface of the negative electrode, the second sidewall of the negative electrode facing away from the positive electrode; and an electrolyte in contact with both the positive electrode and the negative electrode.

11. The planar battery cell of claim 10, further comprising a first metal grid line in electronic communication with the positive current collector and a second metal grid line in electronic communication with the negative current collector.

12. A method of making a planar microbattery cell array, comprising the steps of:
a) providing a substrate that has a working surface;
b) depositing an array of positive electrode lines onto the working surface of the substrate, wherein the positive electrode lines are parallel to one another;
c) depositing an array of negative electrode lines onto the working surface of the substrate, wherein the negative electrode lines are parallel to the positive electrode lines;
d) depositing a first metal ink onto a portion of each positive electrode line to form a positive electrode current collector in contact with the array of positive electrode lines;
e) depositing a second metal ink onto a portion of each negative electrode line to form a negative electrode current collector in contact with the array of negative electrode lines; and
f) applying an electrolyte over the substrate wherein the electrolyte is in contact with the positive electrode lines and the negative electrode lines.

13. The method of claim 12, further comprising, either between step e) and step f) or between step a) and step b), depositing a third metal ink metal onto the working surface of the substrate to form a first set of metal grid lines and a second set of metal grid lines, wherein the first set of metal grid lines are configures to make contact to the positive electrode current collector and the second set of metal grid lines are configured to make contact to the negative electrode current collector in the planar microbattery cell array.

14. The method of claim 13 wherein at least one of the first metal ink, the second metal ink, and the third metal ink comprises metal nanoparticles, metal nanowires, or metal complex precursors, and the metal nanoparticles, metal nanowires, or metal complex precursors comprise one or more metals selected from the group consisting of silver, gold, aluminum, copper, stainless steel, and nickel.

15. The method of claim 13 wherein at least two of the first metal ink, the second metal ink, and the third metal ink are the same.

16. The method of claim 12 wherein depositing an array of positive electrode lines comprises using a positive electrode ink to print the positive electrode lines, wherein the positive electrode ink comprises positive electrode active material particles, conductive additives, binder, and solvent.

17. The method of claim 12 wherein depositing an array of negative electrode line comprises using a negative electrode ink to print the negative electrode lines, wherein the negative electrode ink comprises negative electrode active material particles, conductive additives, binder, and solvent.

18. The method of claim 12 wherein the positive electrode lines and the negative electrode lines are positioned so that either each positive electrode line is between two negative electrode lines, and each negative electrode line is between two positive electrode lines or each positive electrode line is between a positive electrode line and a negative electrode line, and each negative electrode line is between a negative electrode line and a positive electrode line.

19. The method of claim 12 wherein the substrate comprises a material selected from the group consisting of paper, plastic, glass, ceramic, and silicon.

20. The method of claim 12 wherein the working surface of the substrate is a surface that has been prepared with a polymer buffer layer, an oxygen plasma treatment, an ultraviolet ozone treatment, or any combination thereof.

21. The method of claim 12 wherein steps d) and e) are performed at the same time.

\* \* \* \* \*